United States Patent [19]

Yamada

[11] Patent Number: 5,449,892
[45] Date of Patent: Sep. 12, 1995

[54] INFORMATION READING APPARATUS
[75] Inventor: Nobuo Yamada, Toyota, Japan
[73] Assignee: Nippondenso Co., Ltd., Kariya, Japan
[21] Appl. No.: 211,755
[22] PCT Filed: Oct. 28, 1992
[86] PCT No.: PCT/JP92/01395
  § 371 Date: Apr. 15, 1994
  § 102(e) Date: Apr. 15, 1994
[87] PCT Pub. No.: WO93/09514
  PCT Pub. Date: May 13, 1993
[30] Foreign Application Priority Data
  Oct. 29, 1991 [JP] Japan .................. 3-283330
[51] Int. Cl.⁶ .................................. G06K 7/10
[52] U.S. Cl. ........................... 235/462; 235/472
[58] Field of Search .............. 235/462, 472; 250/555, 250/556, 557, 566, 568, 569

[56] References Cited
U.S. PATENT DOCUMENTS

| 4,488,678 | 12/1984 | Hara et al. ............ 235/462 X |
| 4,682,016 | 7/1987 | Inoue ..................... 235/462 |
| 4,782,219 | 11/1988 | Crater .................... 235/462 |
| 4,818,847 | 4/1989 | Hara et al. ............ 235/462 X |
| 4,960,984 | 10/1990 | Goldenfield et al. ....... 235/462 |

FOREIGN PATENT DOCUMENTS

| 61-54570 | 3/1986 | Japan . | |
| 62-147579 | 7/1987 | Japan .................. 235/462 |
| 62-166478 | 7/1987 | Japan .................. 235/462 |
| 63-56768 | 3/1988 | Japan . | |
| 1-196680 | 8/1989 | Japan . | |
| 1-277980 | 11/1989 | Japan . | |
| 2-291086 | 11/1990 | Japan . | |
| 3-158985 | 7/1991 | Japan . | |

Primary Examiner—John Shepperd
Assistant Examiner—Michael G. Lee
Attorney, Agent, or Firm—Cushman, Darby & Cushman

[57] ABSTRACT

An information-reading apparatus that reads optical information formed on a specular surface which provides regular reflection light components with a high luminous intensity. Illumination light beams radiated through a lens, a diffusion reflected component, which is reflected and diffused on a reflection diffuser, is directed to and specularly reflected on the specular surface so that it reaches an image sensor. When the information-reading apparatus is inclined at a specified angle, of a first and second illumination light, the first does not reach the image sensor, but the diffusion reflected light which is a part of the diffusion reflected light does, because the diffusion reflected component is specularly reflected on the specular surface, to travel along the path leading to the image sensor. Accordingly, the information-reading apparatus reads a bar code formed on the specular surface by the normal reading operation, that is, with the reading opening placed in contact with the specular surface.

6 Claims, 13 Drawing Sheets

INFORMATION READING APPARATUS

FIELD OF THE INVENTION

The present invention relates to an information reading apparatus, and more specifically to an apparatus for reading optical information (bar codes, optical characters etc.) provided on a specular or mirror surface (such as a metal surface).

BACKGROUND ART

Conventionally, a bar code reader for a POS (Point of Sales) system reads a bar code by the following method.

A bar code consisting of black bars 20 and white spaces 21, printed on paper as shown in enlarged section along the scanning direction in attached FIG. 7, is irradiated by light beams 200 from a light source (not shown).

The light beam 200 incident on the bar 20 is reflected and diffused on the surface of the bar 20. The surface of the bar 20, in case of in black color, provides a low reflectance. Consequently, the luminous intensity of light reflected on the bar surface to form an image in an image sensor or photoelectric conversion device (such as CCD) is extremely low.

Meanwhile, the light beam 200 incident on the space 21 is also reflected and diffused on the space surface in the same manner as in the black bar 20. Because the surface of the white space 21 provides a high reflectance, the luminous intensity of light (reflected light beam 201) reflected on the space surface to form an image in the image sensor is higher than that of the reflected light from the surface of the bar 20. Thus, the bar code reader identifies bars 20 and spaces 21 based on the difference in the luminous intensity of reflected light beams received by the image sensor, thereby reading bar code information.

Further, the conventional bar code reader for performing the above-described operation is designed to overcome the following drawback.

When the bar code surface is covered with a colorless, transparent laminate or vinyl film, and when the reflection light beam from the bar code surface to form an image in the image sensor is a regular or mirror reflection component, the bar code reader cannot read information, due to halation in the image sensor caused by the excessively high luminous intensity of the reflected light beam.

This problem has been .solved in the conventional bar code reader by designing a housing shape of the bar code reader and the internal optical system layout, so that an optical image is formed in the image sensor not by a regular reflection component but by a diffusion reflection component. As a result, the conventional bar code reader can read bar code information by the aforementioned method even when the bar code surface is covered with colorless, transparent film.

As POS systems and FA systems using the above-mentioned conventional [bar code readers have been spreading in recent years, integrated management of metal products on the basis of bar codes marked directly (by baking etc.) on the products has been increasing (For example, if scalpels for surgical operation bear bar codes on the surface, it is possible to distinguish sterilized scalpels from unsterilized ones, or to determine the sterilizing date of a particular scalpel by bar code). Accordingly, demand has been increasing for an information reading apparatus capable of accurately reading bar codes provided on metal products.

However, the conventional bar code reader described above is designed to form an image in the image sensor by the diffusion reflection component, and not by the regular reflection component of the light reflected on the bar code surface. Therefore, if the conventional bar code reader is used in an attempt to read a bar code on the specular surface of the metal product that provides the regular reflection component of a high luminous intensity, it is not possible to read the bar code by the ordinary method (that is, by placing the reading opening in contact with the bar code surface), due to the low luminous intensity of the diffusion reflection component.

In view of this problem of the conventional bar code reader, to an object of the present invention is to provide an information reading apparatus capable of at least reading optical information formed on a surface that, when light is incident, reflects light whose regular reflection component has higher luminous intensity than that of the diffusion reflection component.

DISCLOSURE OF THE INVENTION

According to the present invention, an information reading apparatus for reading optical information formed on a surface that, when light is incident, reflects light whose regular reflection component has higher luminous intensity than that of the diffusion reflection component is constructed by: a housing with a reading opening; means for reading optical information by receiving the reflected light beam generated on the information-bearing surface and entering the housing through the reading opening; and illumination means for radiating planar diffusion light against the information-bearing surface, causing the reflected light beam to be generated on the information-bearing surface.

The information reading apparatus of the present invention is characterized in that, when the reading opening is placed in contact with the information-bearing surface, at least a part of the image formed by the planar diffusion illumination light reflected by the information-bearing surface, is formed on the extension of the optical path of the reflected light beam.

Owing to the illumination means and the virtual image relation between the illumination means and the information-bearing surface provided by the above mentioned positional arrangement, the planar diffusion light from the virtual image of the illumination means on the information-bearing surface has substantially the same luminous intensity as the regular reflection component. Therefore, the regular reflection component can be received by the reading means after its luminous intensity is lowered.

DETAILED DESCRIPTION OF THE PRESENTLY PREFERRED EMBODIMENTS OF THE PRESENT INVENTION

The present invention is explained in detail below with reference to embodiments shown in the attached drawings.

In the first through fourth and sixth embodiments, the invention is applied to a portable bar code reader. In a fifth embodiment, the present invention is applied to an optical information reading tool of a CCD camera.

Figure 1:
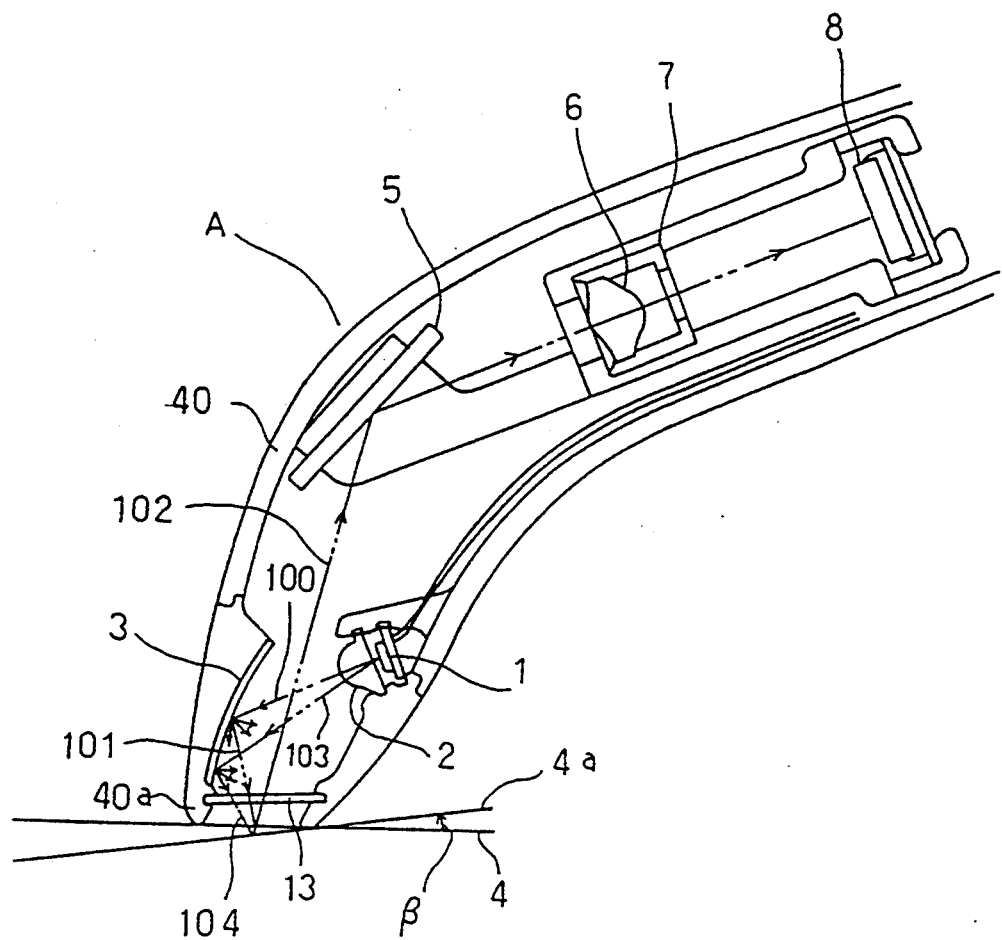
FIG. 1 shows a general structure of a first embodiment of the present invention.
Figure 12:
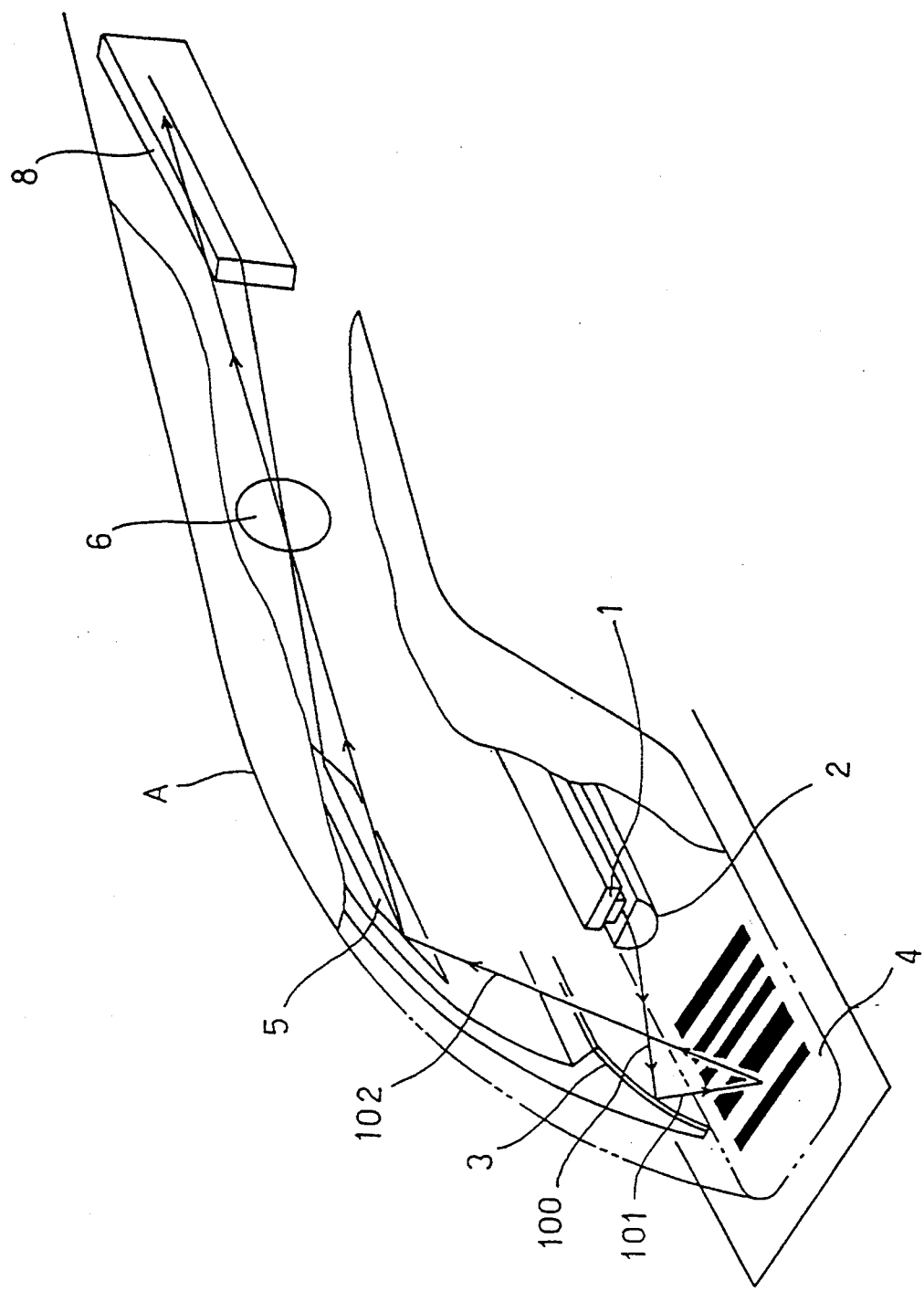
FIG. 12 is a cutaway perspective view of a bar code reader of the first embodiment.

FIG. 1 is a general structural view showing the first embodiment of the present invention, and FIG. 12 is a cutaway perspective view of the same device. In FIGS. 1 through 5, 14 and 15, the embodiments of the invention are shown in section taken along the longitudinal direction of a bar code.

Referring to FIGS. 1 and 12 for the first embodiment, a bar code reader A is composed mainly of a housing 40 with a reading opening 40a, a light source 1 for illumination, a lens 2 to converge light beams into a specified range (so as to irradiate only a reflecting diffuser 3 described below), the reflecting diffuser 3 with a curved (concave) surface (e.g. white Kent paper) to reflect and diffuse incident light in all directions, a reading window panel 13 provided near the reading opening 40a to prevent dust from entering the bar code reader A, a planar reflector 5 to redirect reflected light, a lens 6 installed in a lens barrel 7, and an image sensor 8 to convert received light to an electrical signal according to the luminous intensity of the light. The image sensor 8, of a linear type with multiple photo detectors arranged in a line, is designed to detect the luminous wavelengths of light emitted from the light source 1. The light source 1 and reflecting diffuser 3 constitute a illumination means.

A bar code is provided on a specular or mirror surface 4 (for convenience in the drawing, only a space portion of the bar code, that is, the specular surface is shown). Light incident to the specular surface 4 is specularly reflected (that is, incident light is reflected at the same angle as the incident angle and in the direction opposite to that of incidence). A specular surface 4a is shown in FIGS. 1 through 5, 14 and 15 as if it is inclined by angle $\beta$ with respect to the specular surface 4. In reality, the bar code reader itself is inclined by the angle $\beta$ in relation to the specular surface 4, which should be kept in mind in the explanation of the subsequent description of the specification.

Figure 13:
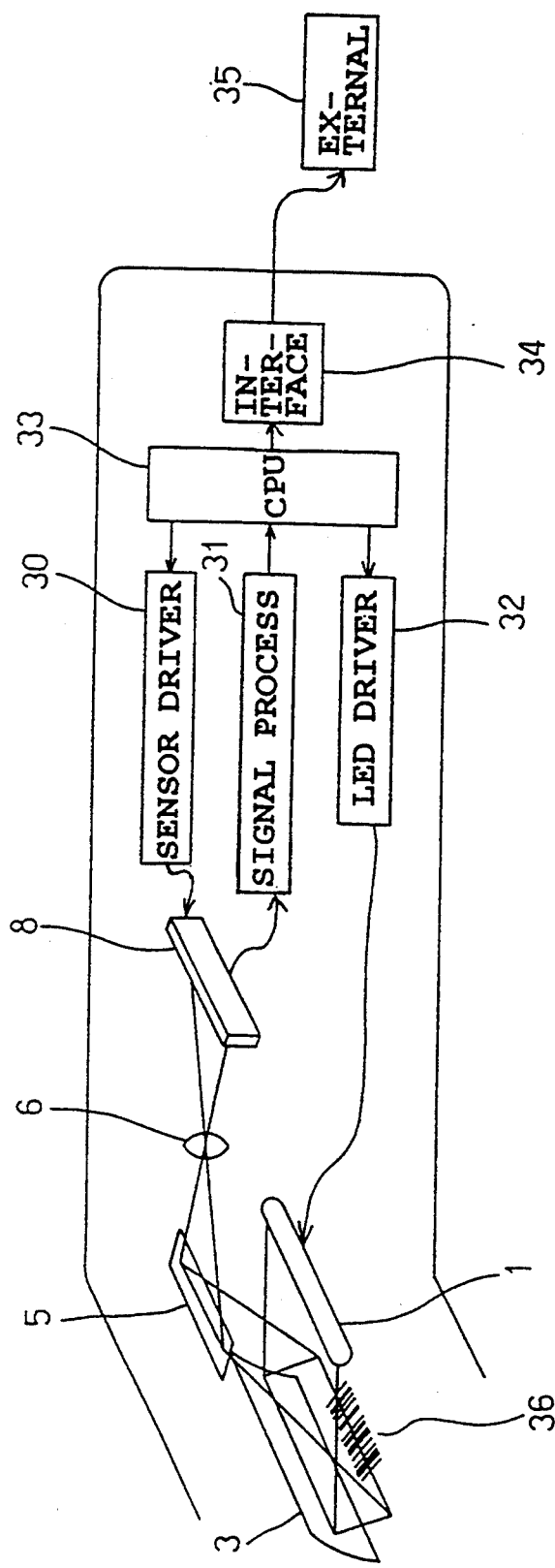
FIG. 13 is a schematic view showing an electrical construction of the bar code reader of the first embodiment.

As shown in FIG. 13, an electrical signal output from the image sensor 8 is amplified and converted to binary code by a sensor signal processing circuit 31, decoded by a CPU 33, and output to an external device 35 through an interface circuit 34. The CPU 33 outputs drive signals to a sensor driver circuit 30 and LED driver circuit 32 to drive the image sensor 8 and light source 1.

The operation of the bar code reader according to the above construction is explained in the following.

Referring to FIGS. 1 and 12, when light is emitted from the light source 1, the light beams reach the reflecting diffuser 3 after being converged into the specified range by the lens 2. The light beams 100 and 103 are then reflected and diffused on the surface of the reflecting diffuser 3.

At this time, if the reading opening 40a is in contact with the specular surface 4, diffusion reflection light 101, which is a part of the light beam 100 in the illumination light 100 and 103 reflected and diffused by the reflecting diffuser 3, reaches the specular surface 4 on which it is specularly reflected to become specular reflected light 102. The specular reflected light 102 is then redirected by the planar reflector 5 toward the lens 6 in the barrel 7. Passing through this lens 6, the specular reflected light 102 forms an optical image in the image sensor 8 which converts the image to the electrical signal.

Thus, the luminous intensity of regular reflected light from the surface area corresponding to a bar code space is lowered due to diffusion reflection on the reflecting diffuser 3. As a result, the bars and spaces of the bar code are distinguished from each other by the difference in luminous intensity of received reflection light, and the bar code information can be read from the electrical signal in the same manner as in the conventional bar code reading.

Meanwhile, if the bar code reader A is inclined by the angle $\beta$, diffusion reflected light 104, which is a part of the light beam 103 of the light beams 100 and 103 reflected and diffused on the reflecting diffuser 3, reaches the specular surface 4a on which it is specularly reflected to become specular reflected light 102. The specular reflected light 102 travels in the same path as mentioned above to enter the image sensor 8 which reads bar code information.

Figure 10:
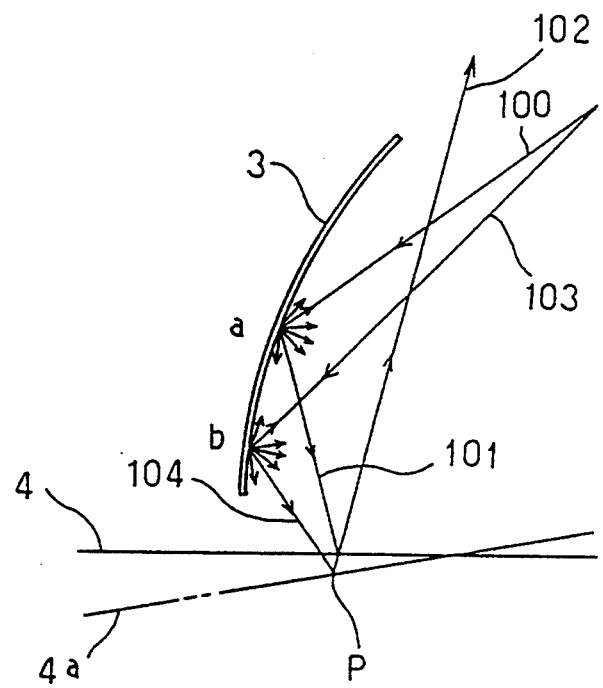
FIG. 10 is an explanatory view for explaining a principle of reading operation in the first embodiment.

Thus, according to the first embodiment, the bar code provided on the specular surface 4 can be read even with the bar code reader A inclined at the angle $\beta$ with respect to the specular surface 4. The principle of the reading operation is described next with reference to FIGS. 10 and 1.

Light beam 100 from the light source 1 reaches a point "a" on the reflecting diffuser 3 through the lens 2 and then diffusion reflected light beam 101, a part of the reflected light beam is directed to the specular surface 4 on which it is specularly reflected to become specular reflected light beam 102 which forms an optical image in the image sensor 8. Similarly, as light beam 103 from the light source 1 reaches a point "b" on the reflecting diffuser 3 through the lens 2, diffusion reflection light beam 104, which is a part of the light beam 103 reflected, is directed to the specular surface 4a. At this time, if the bar code reader A is inclined by the angle $\beta$ with respect to the specular surface 4, the diffusion reflected light beam 104 is specularly reflected on the specular surface 4a to become the specular reflected light beam 102 which forms an optical image in the image sensor 8.

Figure 11:
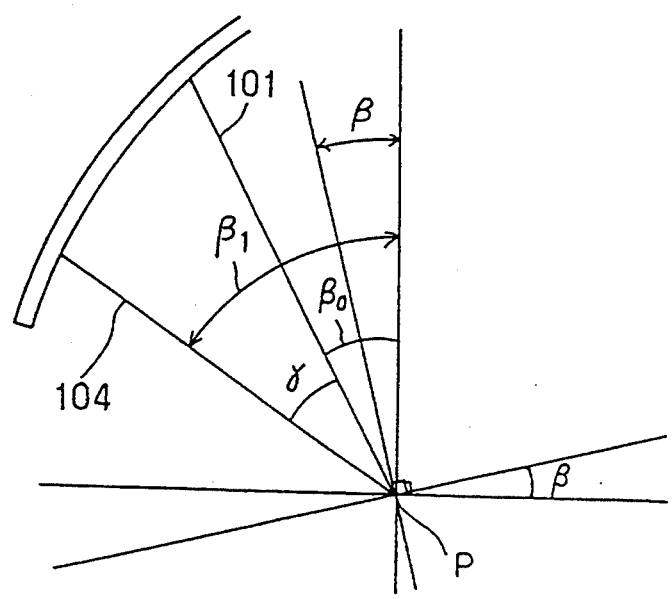
FIG. 11 is an explanatory view for explaining in further detail the principle of the reading operation in the first embodiment.

In other words, the diffusion reflected light beams are emitted from various points ("a" and "b" in FIG. 10) on the reflecting diffuser 3 on which light beams from the light source 1 are incident. Therefore, the diffusion reflected light beams reach a given point "P" of the bar code at various incident angles, as shown in FIG. 11.

Specifically, if the bar code reader A is not inclined, the incident angle of the diffusion reflected light beam 101 on the specular surface 4 is $\beta_0$, and that of the diffusion reflected light beam 104 is $\beta_1$ ($\beta_1=\beta_0+\gamma$). In this case, the diffusion reflected light beam 101 will travel along the optical path to form an image in the image sensor 8. On the other hand, if the bar code reader A is inclined by the angle of $\beta$;

the incident angle of the diffusion reflected light beam 101 on the specular surface $4a=\beta_0-\beta$- - - (1), and the incident angle of the diffusion reflected light beam 104 on the specular surface $4a=\beta_1-\beta=\beta_0+\gamma-\beta$- - - (2).

Assuming the incident angle of the diffusion reflected light beam 104 on the specular surface 4 is $\beta_1=\beta_0+\beta$ (that is, $\gamma=\beta$), the incident angle of the diffusion reflected light beam 104 on the specular surface 4a will be $\beta_0$ and the diffusion reflected light beam 104 will travel along the optical path to form an image in the image sensor 8. Thus, by causing the illumination light beams to be incident to the reflecting diffuser 3 radially as many as possible, many light beams reach the given point "P" of the bar code at different incident angles. Consequently, even if the bar code reader A is inclined- (that is, even if the skew angle is changed), bar code information can be read according to the operation principle mentioned above.

Figure 15:
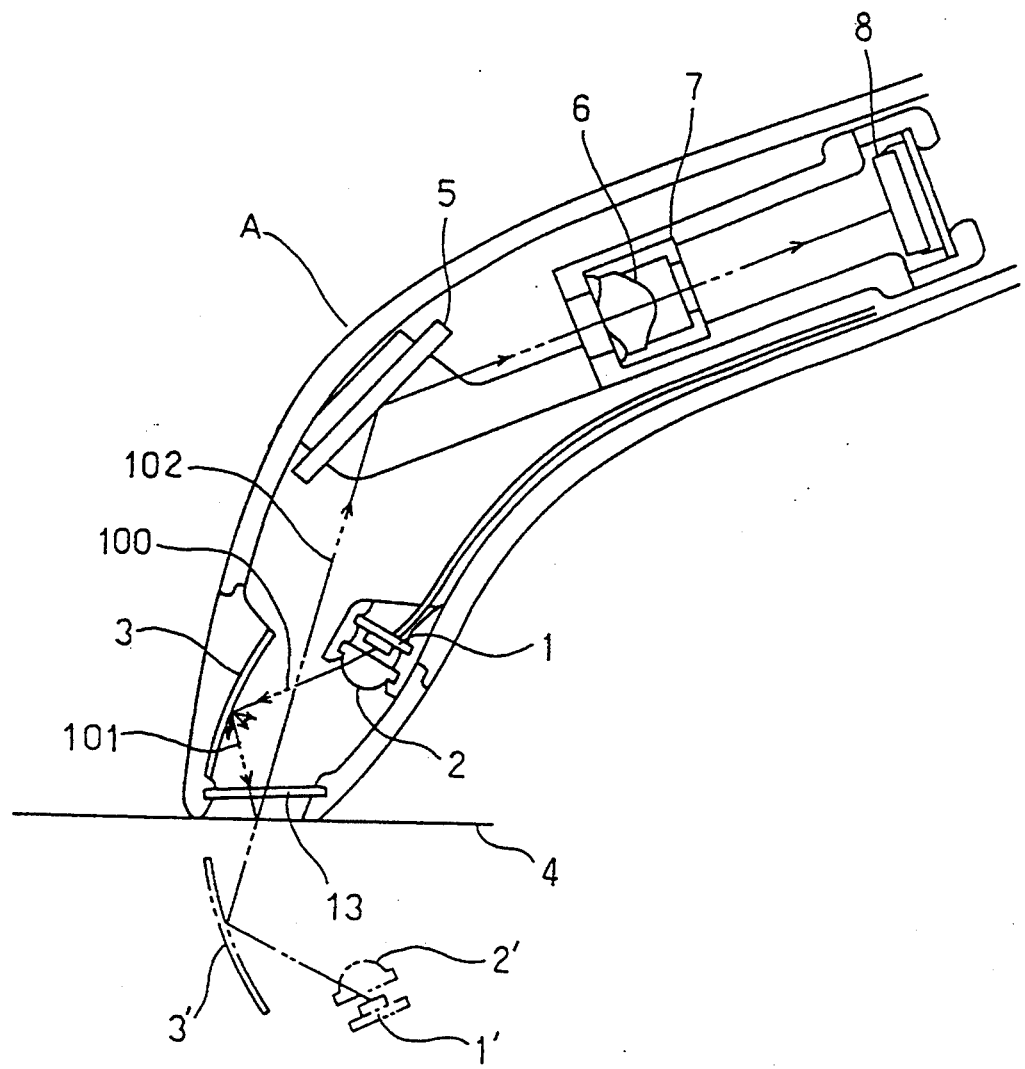
FIG. 15 is an explanatory view for explaining in further detail the principle of reading operation in the first embodiment.

This operation utilizes the effect of virtual images as shown in FIG. 15. Specifically, as the light source 1 and lens 2 are reflected on the specular surface 4, a virtual image 1' of the light source 1 and the virtual image 3' of the reflecting diffuser 3 function as if the light beam is irradiated and pass through the virtual image 3' of the reflecting diffuser to reach the image sensor 8.

When this phenomenon is viewed from the image sensor 8, the reflecting diffuser 3 is reflected on the space corresponding to the specular surface 4. As a result, the luminous intensity of the reflected light beam corresponding to the space from the specular surface 4 is substantially the same as that of the diffusion reflected light beam from the reflection diffuser 3, enabling the bar code reader A to read the bar code information on the specular surface in the same manner as in the bar code printed on paper.

For an ordinary reading operation, it is important that a plurality of light beams irradiate a given point of the bar code at different incident angles, as described above. , The conventional bar code reader using diffusion irradiated light may satisfy the aforementioned incident angle condition if the operating position is not normal. Specifically, as shown in FIG. 9, the diffusion light beam 204 from a point source of light 23 is regularly reflected on the metal surface corresponding to space 22, and the regular reflected light beam 200 passes through a lens 24 to form a bar code image in an image sensor 25, so that bar code information can be read.

Figure 9:
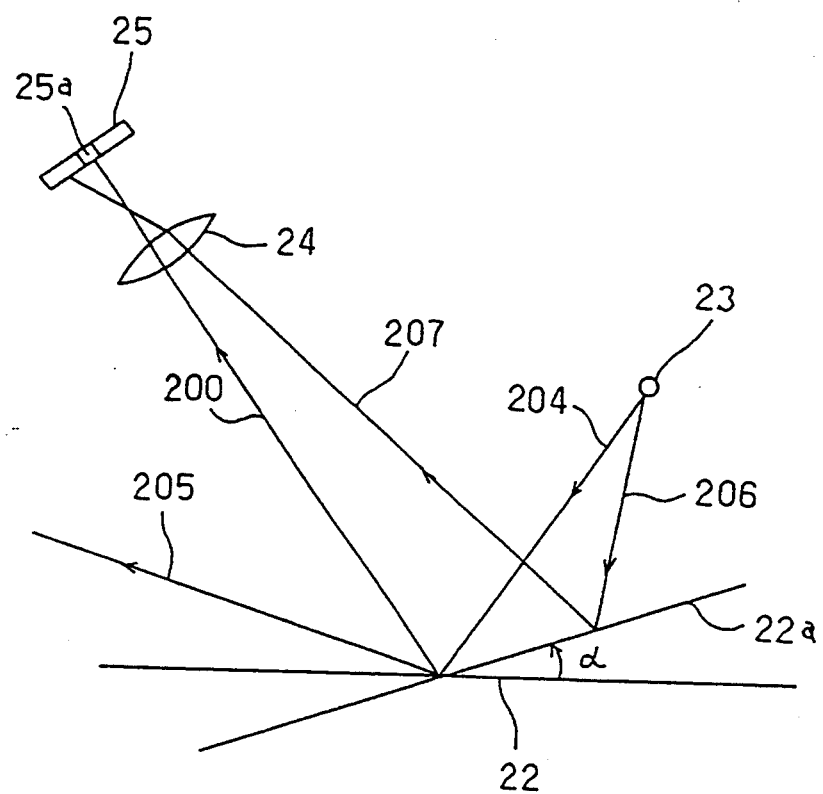
FIG. 9 is an explanatory view for explaining a principle of conventional reading operation with diffused light in the case of a bar code formed on a metal surface.

However, if the bar code reader is inclined by angle $\alpha$ with respect to the metal surface of space 22 (In FIG. 9, the metal surface of space 22a is shown as inclined by angle $\alpha$ from the metal surface of space 22. In reality, the bar code reader itself is inclined at angle $\alpha$ with respect to the metal surface of space 22.), the diffusion light beam 204 is reflected on the metal surface of space 22a, but the reflected light 205 does not reach the lens 24 and image sensor 25 either.

Since the spot source of light 23 emits diffusion light, it radiates many light beams including light beam 206 in addition to the light beam 204. The light beam 206 is also regularly reflected on the space 22a which is the metal surface, and the resultant reflected light 207 reaches the lens 24.

However, with the incident angle at which the reflected light 207 enters the lens 24, the reflected light 207 cannot form a bar code image in the image sensor 25. Therefore, bar code information cannot be read, even if it reaches the lens 24. In short, the bar code reader cannot read bar code information unless it meets the aforementioned incident angle condition. Reading operation with the bar code reader requires adjustment of the incident angle on the bar code surface, and is handling becomes difficult.

In addition, because the image sensor 25 is a linear type, sensor the photoelectric conversion device 25a is small in width in the longitudinal direction of the bar code. Accordingly, only a minor deviation of the reflected light beam incident on the lens 24 would hamper image formation in the image sensor 25. In contrast, with the bar code reader A of the present invention, many light beams irradiate the reflection diffuser 3 radially so that many reflected light beams reach the given point P of the bar code at different incident angles. Therefore, even if bar code reader A is inclined (that is, even if the skew angle is changed), bar code information can be read according to the operation principle mentioned above. This means that the bar code reader can be used in any ordinary operating position for reading bar codes.

As described above, with the bar code reader A of the first embodiment, a plurality of diffusion reflected light beams from the reflection diffuser 3 reach the bar code, and regular reflection components from the bar code enter the image sensor 8 to form the bar code image. Therefore, it is possible to increase the difference in luminous intensity, that is, the differential reflectance (PCS) by which bars and spaces are distinguished (With the bar code reader of the present embodiment, PCS is 80% or higher, compared to about 30% or less with the conventional bar code reader). As a result, even bar codes provided on the specular surface 4 can be read.

In addition, a plurality of diffusion reflected light beams from the reflection diffuser 3 enter a given point of the bar code at different incident angles. Therefore, even if bar code reader A is inclined with respect to the specular surface 4, the reflected light beam from the bar code assuredly enters into the image sensor 8 at a proper angle to form an image. Because it is not necessary to adjust the incident angle of the reflected light beam on the bar code, operating the bar code reader A is simple and easy.

Furthermore, the reflecting diffuser 3 has a concave surface, so that diffusion reflected light beams from the reflecting diffuser 3 are concentrated onto the bar code, securing sufficient luminous intensity to read the bar code.

The following paragraphs describe the second embodiment of the present invention.

Figure 2:
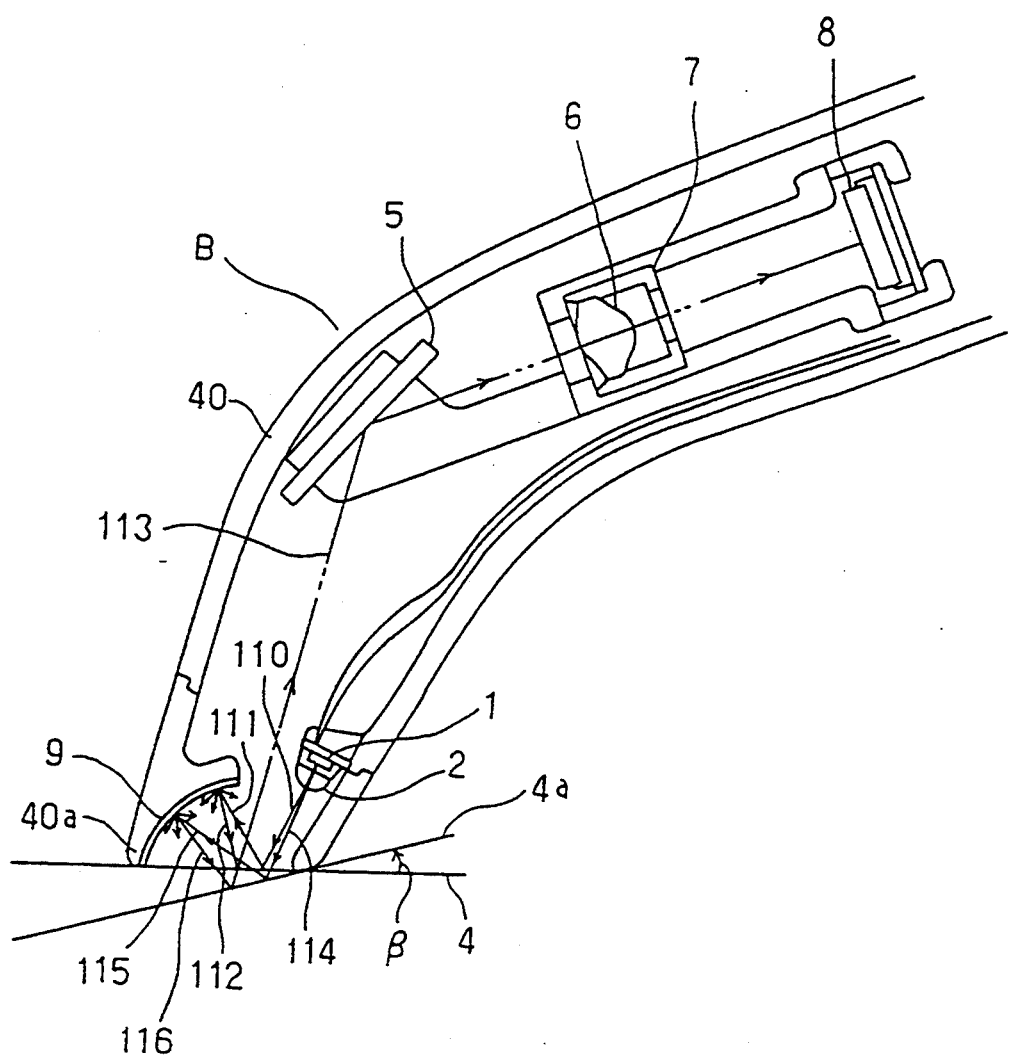
FIG. 2 shows a general structure of a second embodiment of the present invention.

FIG. 2 is a general structural view of the second embodiment of the invention. In FIG. 2 and FIGS. 3 through 5 and 14 for other embodiments to be described later, parts equivalent to those in FIG. 1 are designated by the same reference numerals as in FIG. 1.

Referring to FIG. 2 which shows the second embodiment, a bar code reader B is composed mainly of a housing 40 with a reading opening 40a, an illuminating light source 1, a lens 2 to converge light beams into a specified range (so as to irradiate only a reflection diffuser 9), a reflection diffuser 9 to reflect and diffuse incident light beams, a planar reflector 5, a lens 6 installed in a lens barrel 7, and an image sensor 8. The second embodiment is different from the first embodiment in the method of obtaining the optical path to form an image in the image sensor 8. A transparent panel 13 is not provided in the second embodiment. It may be installed as necessary.

The operation of the second embodiment is as follows. Referring to FIG. 2, light emitted from the light source 1 is diffused radially through the lens 2 and reaches the specular surface 4. The light beams 110 and 114 reaching the specular surface 4 is specularly reflected by the surface 4 to become a specularly reflected light beam 111, which is directed to, and reflected and diffused on the reflection diffuser 9. The diffusion reflected light beam 112, which is part of the specularly reflected light beam 111 reflected and diffused, is directed again to the specular surface 4, from which it is specularly reflected again to become a diffused specularly reflected light beam 113.

This diffused specularly reflected light beam 113 is redirected by the planar reflector 5 to the lens 6 in the barrel 7. Passing through this lens 6, the light beam 113 forms a bar code image in the image sensor 8, which converts the image into an electrical signal. Therefore, if bar code reader does not receive a reflected light beam, it concludes that a bar is being irradiated, and if it receives the reflected light beam, it concludes that a space is being irradiated. Thus, the bar code information can be read based on the electrical signals, as the conventional bar code printed on paper are read.

Meanwhile, if bar code reader is inclined at an angle of β, light irradiated through the lens 2 and the specular surface 4a is reflected specularly to become the specularly reflected light beam 115, which is directed to and reflected and diffused. The diffusion reflected light beam 116, which is a part of the specularly reflected light beam 115 reflected and diffused is directed again to the specular surface 4, from which it is specularly reflected again to become a specularly reflected diffusion light beam 113. The specularly reflected diffusion light beam 113 travels the same path as mentioned above, to reach the image sensor 8, thus enabling bar code information reading.

As mentioned above, the bar code reader B according to the second embodiment utilizes the specular reflection property of the specular surface 4 on which the bar code is provided. Specifically, a specularly reflected light beam from the specular surface 4 is reflected and diffused on the reflection diffuser 9, to be directed to and reflected again from the specular surface 4, thereby achieving the optical path to form an image in the image sensor 8. In short, the specular surface 4 is used as a reflection mirror similar to the planar reflector 5.

This method is applicable only when the bar code printed surface is specular (The surface may be matt-finished, as described later). On the specular surface, even if light is reflected repeatedly, substantial decrease in luminous intensity does not occur, due to the low optical absorption (or high reflectance) of the specular surface. That is, the reflected light maintains sufficient luminous intensity for the bar code reader to distinguish spaces from bars (If the luminous intensity of the reflected light is insufficient, spaces are read as bars).

As in the case of the first embodiment, even if bar code reader B is inclined with respect to the specular surface 4 to read a bar code, reflected light from the bar code travels along the proper path to form an image in the image sensor 8. Therefore, handling of bar code reader B is also easy, with no need to adjust the incident angle of light on the bar code surface.

In the second embodiment described above, the specular surface 4 is exposed to emit light beams. Alternatively, the specular surface 4 may be exposed to parallel light beams of a laser or the like source.

Next, the third embodiment of the present invention is described.

Figure 3:
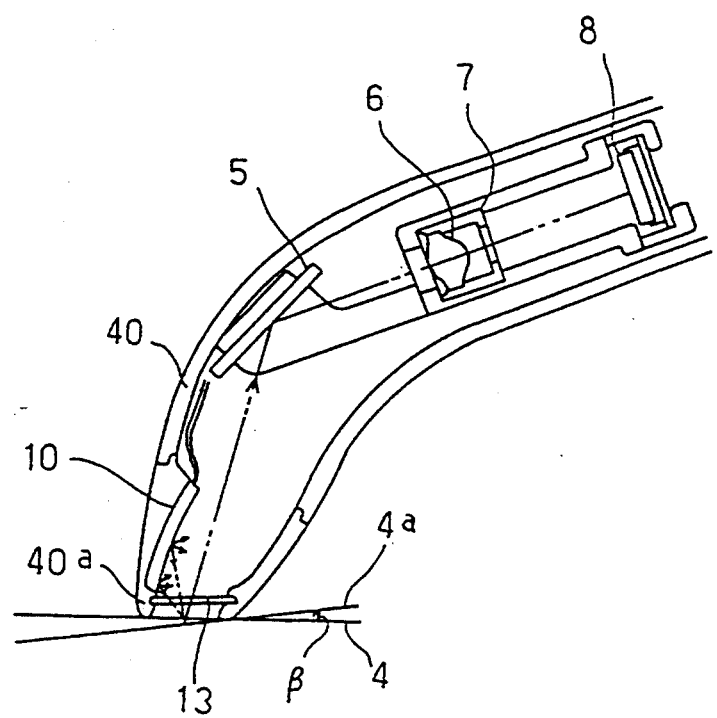
FIG. 3 shows a general structure of a third embodiment of the present invention.

FIG. 3 is a general structural view of the third embodiment. The third embodiment differs from the first embodiment in the method of leading diffusion reflected light beams to the specular surface 4. Instead of the light source 1, lens 2 and reflection diffuser 3 of the first embodiment, employed is a surface-illuminating or planar light source 10 so that the specular surface 4 is irradiated directly with diffusion light beams emitted from multiple points of the light source 10, as shown in FIG. 3. By this feature, not only the same effect as the first embodiment is obtained, but also the light source 10 may be located near the reading object (bar code). Thus, the bar code reader is simplified in construction, while sufficient luminous intensity of reflected light is secured easily.

Figure 4:
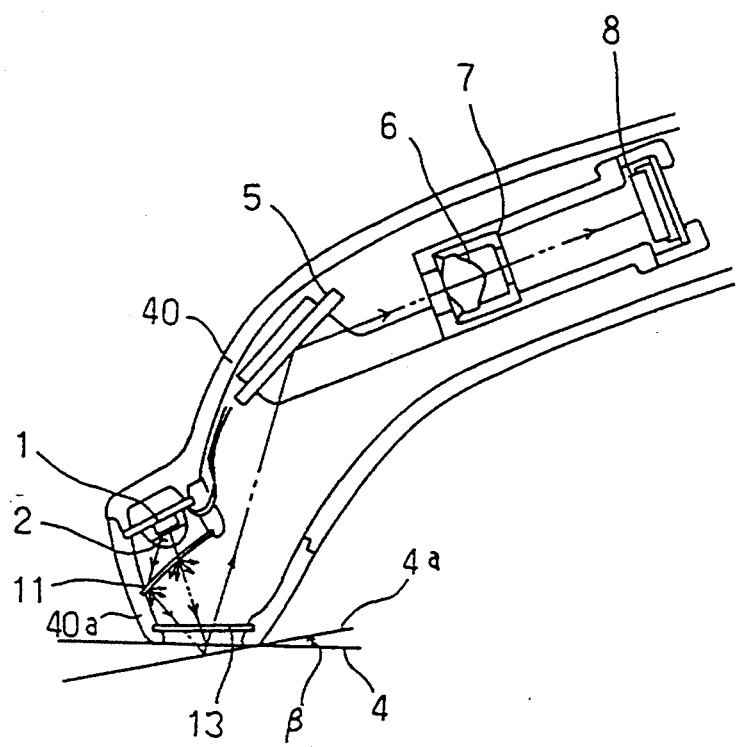
FIG. 4 shows a general structure of a modification of the third embodiment.

As a modification of the third embodiment, the surface-illuminating light source 10 may be replaced by the structure shown in FIG. 4. That is, instead of the surface-illuminating light source 10, the same light source 1 and lens 2 as used in the first embodiment may be installed, with a diffusion transmitting plate 11 positioned on the light output side of the lens 2 so that diffusion light beams are output directly from multiple points toward the specular surface 4.

The following paragraphs describe the fourth embodiment of the invention.

Figure 5:
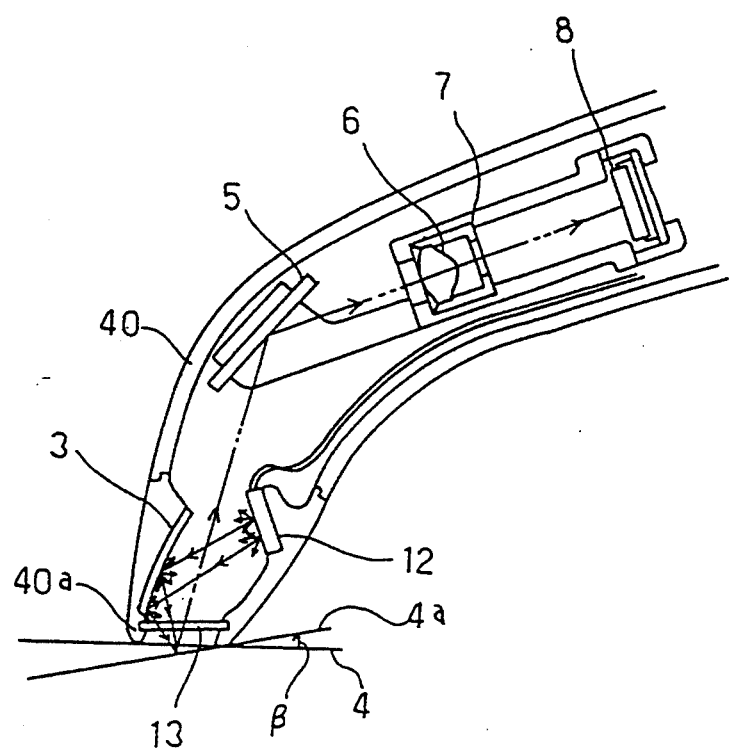
FIG. 5 shows a general structure of a fourth embodiment of the present invention.

FIG. 5 is a general structural view of the fourth embodiment, which is different from the first embodiment in the method of leading diffusion reflection light beams to the specular surface 4. Instead of the light source 1 and lens 2 of the first embodiment, a surface-illuminating light source 12 is used as shown in FIG. 5 so that the diffusion reflected light beams from the reflection diffuser 3 irradiate the specular surface 4 at many angles. This feature of the fourth embodiment not only provides the same effect as the first embodiment, but also permits more diffusion reflected light beams to reach a given point of the bar code at different incident angles than in the case of using the lens 2. This increases the freedom of angles at which the bar code reader is inclined with respect to the specular surface.

Next, the fifth embodiment of the invention is described.

In the fifth embodiment, the invention is applied to an optical information reading tool using a CCD camera.

Figure 6:
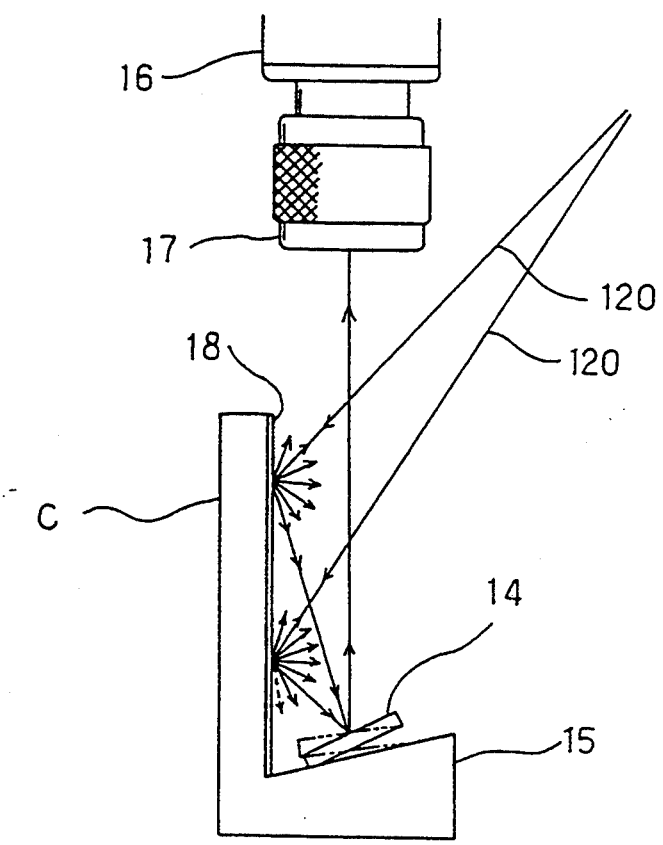
FIG. 6 shows a general structures of a fifth embodiment of the present invention.
Figure 7:
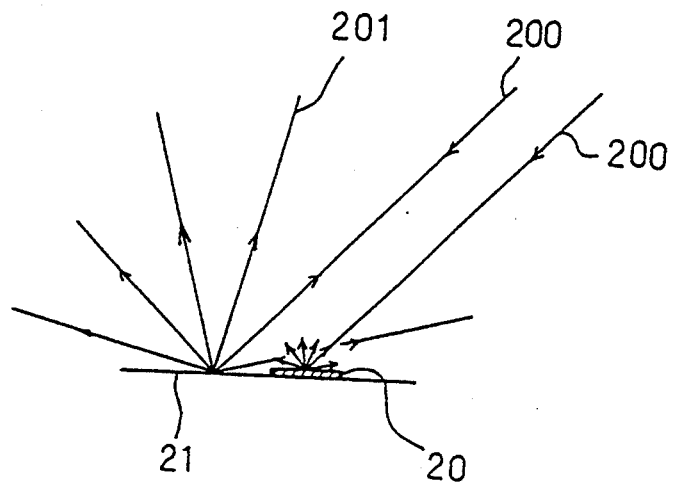
FIG. 7 is an enlarged sectional view for explaining a principle of conventional reading operation in case of bar code printed on a paper surface.
Figure 8:
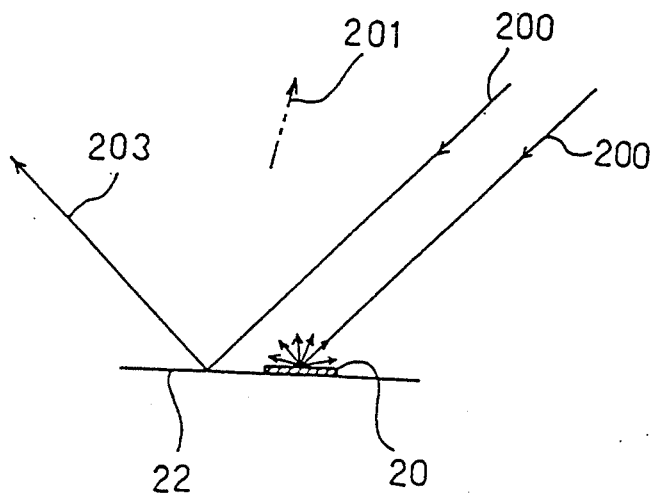
FIG. 8 is an enlarged sectional view for explaining a principle of a conventional reading operation in a bar code formed on a metal surface.

Referring to FIG. 6, a reading tool C is composed mainly of a table 15 on which is placed a reading object 14 with a bar code provided on the specular surface, a CCD camera 16, a lens 17, and a reflection diffuser 18 which reflects and diffuses incident light beams.

The operation of the fifth embodiment is described in the following. When light beams 120 emitted from a light source (not shown) irradiate the reflection diffuser 18 mounted on the table 15, the beams are reflected and diffused over the entire surface of the reflection diffuser 18. As a result, the diffusion reflected light beams irradiate the bar code provided on the specular surface of the reading object 14 at many angles. Regardless of the angle at which the reading object 14 is placed on the table 15, a portion of the diffusion reflection light beams irradiating the reading object 14 is specularly reflected, and directed through the lens 17 into the CCD camera 16. Therefore, the bar code information on the reading object 14 can be read according to the same operation principle as for each of the embodiments described above.

The applicant has confirmed that the reading tool of the fifth embodiment can read bar code even under general illumination including natural light, if the performance level of the CCD camera 16 is moderately high. This means that the reading tool does not require a special illumination light source, and therefore is energy conservative.

Next the following paragraphs describe the sixth embodiment of the invention.

Figure 14:
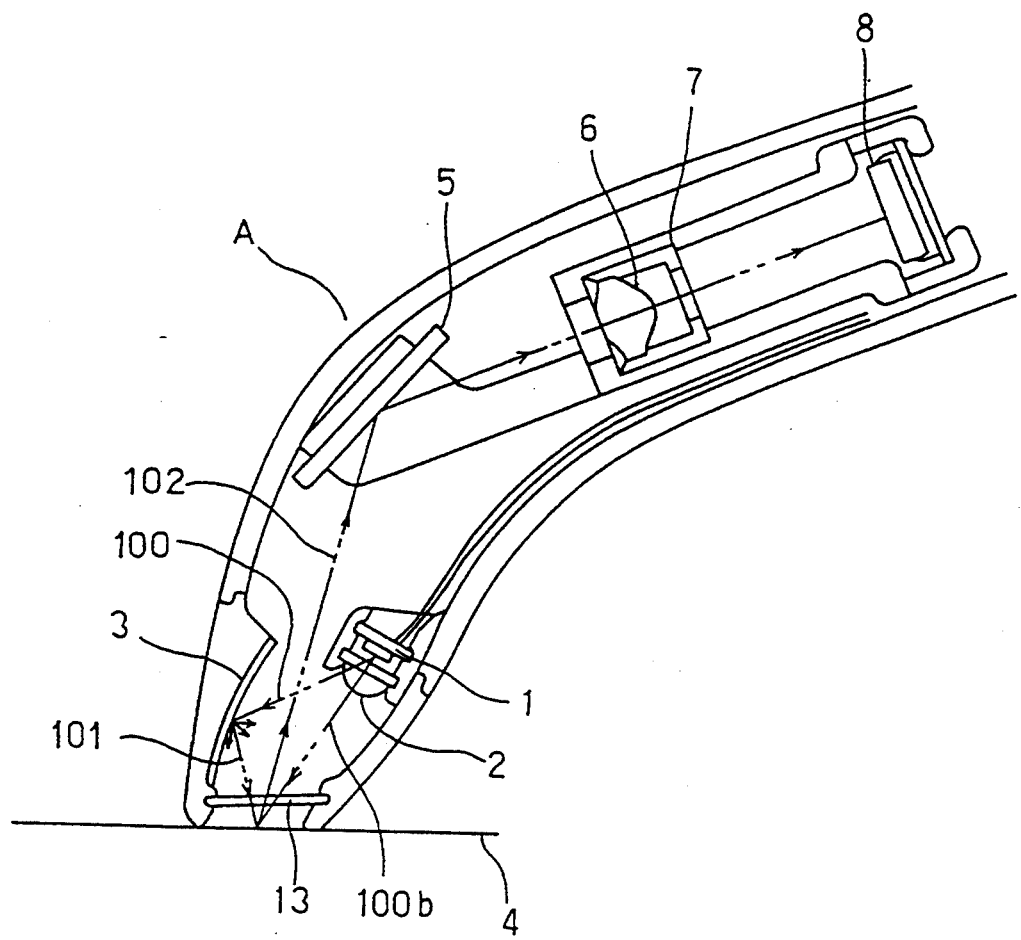
FIG. 14 shows a general structure of a sixth embodiment of the present invention.

FIG. 14 is a general structural view of the sixth embodiment. In the sixth embodiment of the invention, a reflection diffuser 3 is installed in the conventional bar code reader (whose light source 1 faces not the reflection diffuser 3 but the bar code), to obtain two optical paths: a first optical path (100b→102) for reading bar code on paper, and a second optical path (100→101→102) for reading bar code on specular surface. According to this, bar codes, whether printed on paper or specular surface, can be read by only adding the reflection diffuser 3 and without making any change in the housing shape or the internal optical component layout of the conventional bar code reader.

Other embodiments of the present invention are briefly described in the following.

In all of the first through sixth embodiments mentioned above, light beams incident to the specular surface 4 (including reflected light beams incident the second time on the specular surface) are diffused light beams. Alternatively, parallel light beams like those of a laser may be used if such light beams are incident to the bar code at various incident angles when viewed from a point of a given point on the bar code.

In any of the first through sixth embodiments, the invention is applied to an apparatus for reading bar codes. The invention may be applied to apparatuses for reading other optical information (such as characters and binary codes).

In any of the first through sixth embodiments mentioned above, the invention is applied to apparatus for reading bar codes printed on a specular surface. The invention may also be applied to apparatuses for reading optical information printed on otherwise-treated surface on which the regular reflection component (the reflection component whose reflection angle is identical with the incident angle) of reflected light generated from the surface when exposed to illumination light has higher luminous intensity than that of a diffusion reflected component (light component reflected in a direction different from that of the regular reflected component). An example of such apparatus is a bar code reader for reading bar code information printed on a matt-finished or hairline-finished surface.

In all of the first through sixth embodiments of the invention, the size, installation angle and shape of the reflection diffuser or equivalent member must be such that it is reflected on the specular surface 4 around the bar code on the specular surface 4 which provides specular reflection, when viewed from the image sensor side. Preferably, the color of the reflection diffuser should be white, so that the illumination color is reflected as it is, or should be the same as the illumination light color (red, in general).

The information reading apparatus of any of the first through sixth embodiments is not necessarily used exclusively to read information provided on a specular surface as described above. It may also be used to read bar codes printed on ordinary paper.

INDUSTRIAL APPLICABILITY OF THE INVENTION

According to the present invention, as described above, if the reading opening is placed in contact with a specular surface—a normal reading position—to read information printed thereon, at least a portion of the planar diffusion illumination light forms a virtual image on the information-bearing surface, along the extension of the optical path of the reflection light beam. Therefore, the reading device can receive reflected light, with the luminous intensity of the regular reflected light component being decreased by adjusting the light source and the component layout.

Accordingly, even the bar code provided on the specular surface can be read accurately by normal reading operation. Thus, the information reading apparatus of the present invention is applicable to a centralized control system for metal products, specifically a system to manage metal products, such as scalpels and food preserve cans, by bar codes marked directly (by baking etc.) on the products.

What is claimed is:

1. An information reading apparatus for reading optical information provided on a surface, wherein the surface reflects light when light is incident thereon such that a regular reflection component has a higher luminous intensity than a diffusion reflection component, said apparatus comprising:

a housing having a reading opening defined therein;

a light source installed in said housing, said light source emitting illumination light to illuminate the optical information through said reading opening;

photoelectric conversion means installed in said housing for receiving reflected light from the optical information and for converting said reflected light into an electric signal;

light reflection and diffusion means having a concave shape and installed in said housing for diffusing and reflecting said illumination light emitted by said light source so that uniform diffusion light irradiates an area of the surface including the optical information at various angles when said reading opening is positioned near said surface; and an optical system installed in said housing for leading to said photoelectric conversion means the regular reflection component generated by irradiating the optical information by said uniform diffusion light from said light reflection and diffusion means.

2. An information reading apparatus as claimed in claim 1, wherein said surface is specular, and said light source is installed near said reading opening in said housing on one of upper and lower side walls to emit light toward said reflection and diffusion means.

3. An information reading apparatus as claimed in claim 1, wherein said surface is specular and said light source is a planar-shaped surface-illuminating light source, said information reading apparatus further comprising a second light diffusion means, said second light diffusion means being provided on an external surface of said light source.

4. An information reading apparatus for reading optical information provided on a surface, wherein the surface reflects light such that a regular reflected component has higher luminous intensity than a diffusion reflected component when light is incident thereon, said apparatus comprising:

a housing having a reading opening defined therein;

a light source installed in said housing for emitting illumination light to illuminate the optical information through said reading opening, wherein said light source is installed near said reading opening in said housing on one of upper and lower side walls to emit its light toward the other of said upper and lower side walls;

photoelectric conversion means installed in said housing for receiving reflected light from the optical information and converting it into an electric signal;

light diffusing means installed in said housing for diffusing said illumination light emitted by said light source so that uniform diffusion light irradiates an area including the optical information at various angles when said reading opening is positioned near said surface, wherein said light diffusion means is installed near said reading opening in said housing on the other side wall facing said light source; and an optical system installed in said housing for leading to said photoelectric conversion means said regular reflected component generated by irradiating the optical information by said uniform diffusion light from said light diffusion means.

5. An information reading apparatus for reading optical information provided on a surface, wherein the surface reflects light such that a regular reflected component has a higher luminous intensity than a diffusion reflected component when light is incident thereon, said apparatus comprising:

a housing having a reading opening defined therein;

a light source installed in said housing for emitting illumination light to illuminate the optical information through said reading opening, wherein said light source is installed near said reading opening in said housing on one of upper and lower side walls to emit said illumination light toward said specular surface;

photoelectric conversion means installed in said housing for receiving reflected light from the optical information and converting it into an electric signal;

light diffusion means installed in said housing for diffusing said illumination light emitted by said light source so that uniform diffusion light irradiates an area including the optical information at various angles when said reading opening is positioned near said specular surface, wherein said light diffusion means is installed near said reading opening in said housing on the other of said upper and lower side walls to reflect light from said specular surface and diffuse it toward said specular surface including said optical information; and an optical system installed in said housing for leading to said photoelectric conversion means a regular reflected component generated by irradiating the optical information by said uniform diffusion light from said light diffusion means.

6. An information reading apparatus for reading optical information located on a surface that provides reflected light whose regular reflected component has a higher luminous intensity than a diffusion reflected component when light is incident thereon, comprising:

a light source for emitting light to illuminate said optical information;

photoelectric conversion means for receiving reflected light from said optical information and converting it to an electric signal;

light diffusion and reflection means having a concave shape and installed for diffusing and reflecting illumination light emitted by said light source to uniformly illuminate an area of said specular surface including said optical information at various angles; and an optical system for leading to said photoelectric conversion means said regular reflected component generated from said optical information illuminated by illumination light from said light diffusion and reflection means.

* * * * *